United States Patent [19]

Bajorek et al.

[11] Patent Number: 5,564,750

[45] Date of Patent: Oct. 15, 1996

[54] ENERGY SAVING AND HEAT VENTING VEHICLE MUD FLAP

[75] Inventors: Jay E. Bajorek, Wadsworth; Austin E. Cox, Medina; Eugene S. Kovack, Wadsworth; Michael S. Lionetti, Wadsworth; Joe Smisko, Wadsworth, all of Ohio

[73] Assignee: Concept Five, Inc., Wadsworth, Ohio

[21] Appl. No.: 435,085

[22] Filed: May 4, 1995

[51] Int. Cl.⁶ .................................................. B62D 25/16
[52] U.S. Cl. ........................................ 280/851; 280/848
[58] Field of Search .......................... 280/152.2, 152.3, 280/154, 155, 159, 160, 770, 847, 848, 849, 851; 454/276, 277, 281, 282, 309, 330

[56] References Cited

U.S. PATENT DOCUMENTS

| | | | |
|---|---|---|---|
| D. 263,696 | 4/1982 | Regler | D12/185 |
| D. 279,560 | 7/1985 | Jensen | D12/185 |
| 2,405,262 | 8/1946 | Lindsay | 280/153 |
| 3,088,751 | 1/1962 | Barry et al. | 280/154.5 |
| 3,095,215 | 6/1963 | Black | 280/851 |
| 3,279,818 | 10/1966 | Jones | 280/154.5 |
| 3,350,114 | 9/1965 | Salisbury | 280/154.5 |
| 3,582,108 | 6/1971 | Carlton | 280/154.5 |
| 4,215,873 | 8/1980 | Price | 280/851 |
| 4,372,570 | 2/1983 | Goodall | 280/154.5 |
| 4,487,422 | 12/1984 | Turunen | 280/154.5 |
| 4,660,846 | 4/1987 | Morin | 280/154.5 |
| 4,921,276 | 5/1990 | Morin | 280/848 |
| 4,964,655 | 10/1990 | Tucker | 280/851 |
| 5,257,822 | 11/1993 | Metcalf | 280/851 |
| 5,273,318 | 12/1993 | Nakayama et al. | 280/851 |
| 5,366,247 | 11/1994 | Fischer | 280/851 |
| 5,460,411 | 10/1995 | Becker | 280/851 |

FOREIGN PATENT DOCUMENTS

| | | | |
|---|---|---|---|
| 1575907 | 7/1969 | France | 280/154.5 |
| 2524344 | 9/1976 | Germany | 280/851 |
| 2209720 | 5/1989 | United Kingdom | 280/848 |

*Primary Examiner*—Richard M. Camby
*Assistant Examiner*—Frank Vanaman
*Attorney, Agent, or Firm*—Renner, Kenner, Greive, Bobak, Taylor & Weber

[57] ABSTRACT

A vehicle flap (10) carried in a rearward position with respect to a vehicle tire (12) including a frame (14) with a pair of substantially parallel side walls (22) substantially perpendicular to and carried by a top member (18). The top member (18) is adapted to be carried by a vehicle (48). Vehicle flap (10) has a front side facing a tire (12) opposite a rear side. A roll base (34) extends outwardly toward vehicle tire (12) from near the bottom of flap (10). Vehicle mud flap (10) also has a plurality of arcuate, angularly-directed parallel vanes (24) which extend between the side walls (22) and extend downwardly from the front side to the rear side of the flap (10). The parallel vanes (24) form a plurality of openings (28) such that the parallel vanes (24) redirect any debris from the rotating vehicle tire (12) downwardly through the debris openings (28) while allowing the flow of air therethrough.

8 Claims, 3 Drawing Sheets

ENERGY SAVING AND HEAT VENTING VEHICLE MUD FLAP

TECHNICAL FIELD

The present invention generally relates to vehicle mud flaps. More particularly, the present invention relates to a vehicle mud flap with openings that downwardly divert debris while allowing air to flow therethrough.

BACKGROUND ART

Many different forms of vehicle mud flaps are known in the art. Such devices, which are typically mandated for tractor-trailers by state regulations, are mounted behind vehicle tires for the purpose of blocking various types of debris that are projected from a rotating tire and the road surface. In particular, the common rectangular vehicle mud flap prevents water, mud, rocks and the like from being directed rearwardly into the path of a following vehicle. Vehicle mud flaps are typically used on tractor-trailers and other large vehicles which have tires that are not at least partially enclosed by the vehicle itself. Typically, the vehicle mud flap is mounted rearwardly of the rear tire and extends to, but does not come in contact with, the road surface.

Although the common rectangular vehicle mud flaps are effective in deflecting debris and other material, their use has several drawbacks. Primarily, the rectangular vehicle mud flap is not aerodynamic. As such, the mud flap restricts the flow of air as the vehicle travels at highway speeds, thereby increasing the fuel consumption of the vehicle. A further drawback of conventional vehicle mud flaps is that they trap and reflect back heat generated by the tire and road surface in an area close to the tire surface. This destructive hot air, generated by the hysteresis loss of the rolling tires, contributes significantly to the breakdown of the tire. As such, this excessive heat may contribute to the separation of the tire tread from the casing, endangering the driver of the vehicle and any driver following in close proximity.

Yet another drawback of conventional vehicle mud flaps is that they generate side splash. Side splash occurs when the tire directs debris against the face of the mud flap which subsequently deflects the debris outwardly along the sides. This side splash, which is often vision impairing, then comes in contact with a car or other vehicle that is on either side of the mud flap.

Still another drawback of common rectangular vehicle mud flaps is that nothing prevents the mud flap from being caught in the tire tread as the vehicle backs up against a loading dock or curb condition. This can cause the vehicle mud flap to tear off or become frayed and lose its effectiveness for diverting debris away from following vehicles.

Several attempts have been made to correct the aforementioned problems. For example, vehicle mud flaps have been developed with straight-through holes or apertures to improve the aerodynamic flow of the vehicle. However, these holes of necessity must be small and are therefore easily clogged. Moreover, the small size of the holes preclude relieving heat generated by the tire and road surface. These holes can also allow the passage of liquid debris.

Other types of vehicle flaps that attempt to overcome the aforementioned drawbacks include those with multiple screens or brackets. Unfortunately, these screens still allow some debris to pass therethrough. Such screens are also typically made of metal which tends to rust and deteriorate due to the harsh road conditions found on major highways.

It will also be appreciated that these screened vehicle flaps are heavier and require a high amount of maintenance as they have complicated airflow patterns and also tend to become clogged after extensive use.

Finally, none of the aforementioned attempts to correct the drawbacks of a rectangular vehicle mud flap or address the problem of a vehicle mud flap that tears off or becomes worn or frayed due to the backing of the vehicle onto loading docks and curb conditions.

Therefore, a need exists for an energy-saving and heat-venting vehicle mud flap which is effective in decreasing the fuel consumption of the vehicle on which it is carried and also to increase the life of the tires by allowing the heat to escape. Furthermore, there exists a need for a vehicle mud flap that precludes damage to the flaps due to backing the vehicle into loading docks or obstructions which cause complete or partial detachment of the flap.

DISCLOSURE OF THE INVENTION

It is therefore a primary object of the present invention to provide an energy-saving and heat-venting vehicle mud flap.

It is another object of the present invention to provide a vehicle mud flap, as above, that prevents rearwardly-directed debris from a vehicle tire to be directed toward a following vehicle.

It is an additional object of the present invention to provide a vehicle mud flap, as above, that allows air to flow therethrough keeping the mud flap more vertical while reducing fuel consumption of the vehicle which is moving and using the mud flap.

It is a further object of the present invention to provide a vehicle mud flap, as above, that disperses heat generated by the tire and road surface, thereby increasing the life of the tire.

It is a still further object of the present invention to provide a vehicle mud flap, as above, that has an inwardly-extending roll bar to preclude the entire flap from being subject to damage by a loading dock or the like when the vehicle backs up.

It is yet another object of the present invention to provide a vehicle mud flap, as above, made of an injection-molded polymeric material such as polypropylene which is easy to produce and maintain, light in weight and which provides an overall cost savings over other known vehicle mud flaps.

These and other objects of the present invention, as well as the advantages thereof over existing prior art forms, which will become apparent from the description to follow, are accomplished by the means hereinafter described and claimed.

In general, a vehicle flap made in accordance with the present invention includes a frame with a pair of substantially parallel side members extending substantially perpendicularly downwardly from a top member, the top member being carried by a vehicle. The side members carry a plurality of angularly-directed parallel vanes substantially perpendicular thereto such that the side members and the parallel vanes form a plurality of debris openings therebetween. The parallel vanes redirect downwardly through the openings any debris from a rotating vehicle tire while allowing the flow of air therethrough.

A preferred exemplary vehicle mud flap, incorporating the concepts of the present invention, is shown by way of example in the accompanying drawings without attempting to show all of the various forms and modifications in which the invention might be embodied, the invention being measured by the appended claims and not by the details of the specification.

PREFERRED EMBODIMENT FOR CARRYING OUT THE INVENTION

Figure 1:
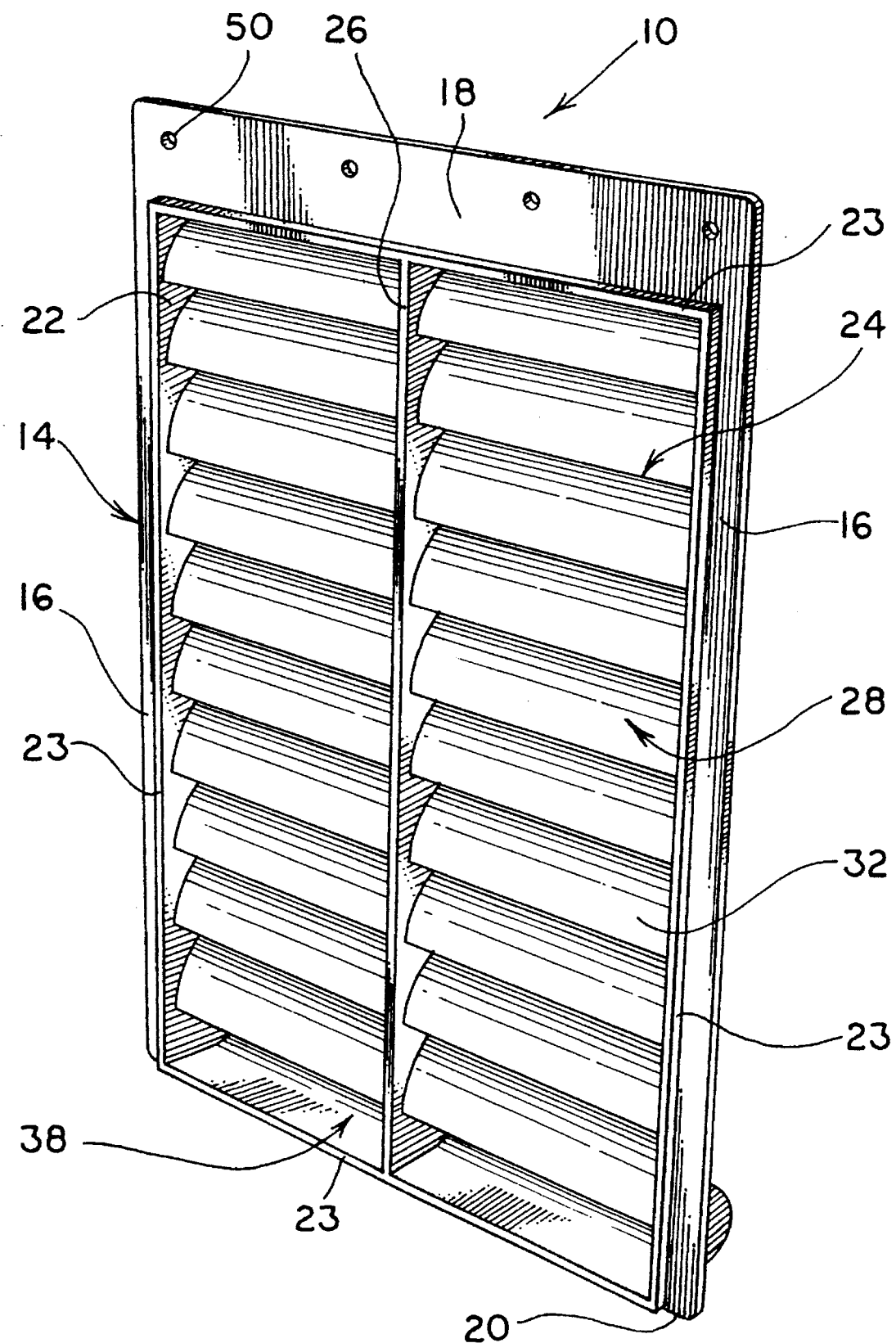
FIG. 1 is a perspective view of a vehicle mud flap as it appears when viewed from the rear of the vehicle and made in accordance with the concepts of the present invention.
Figure 2:
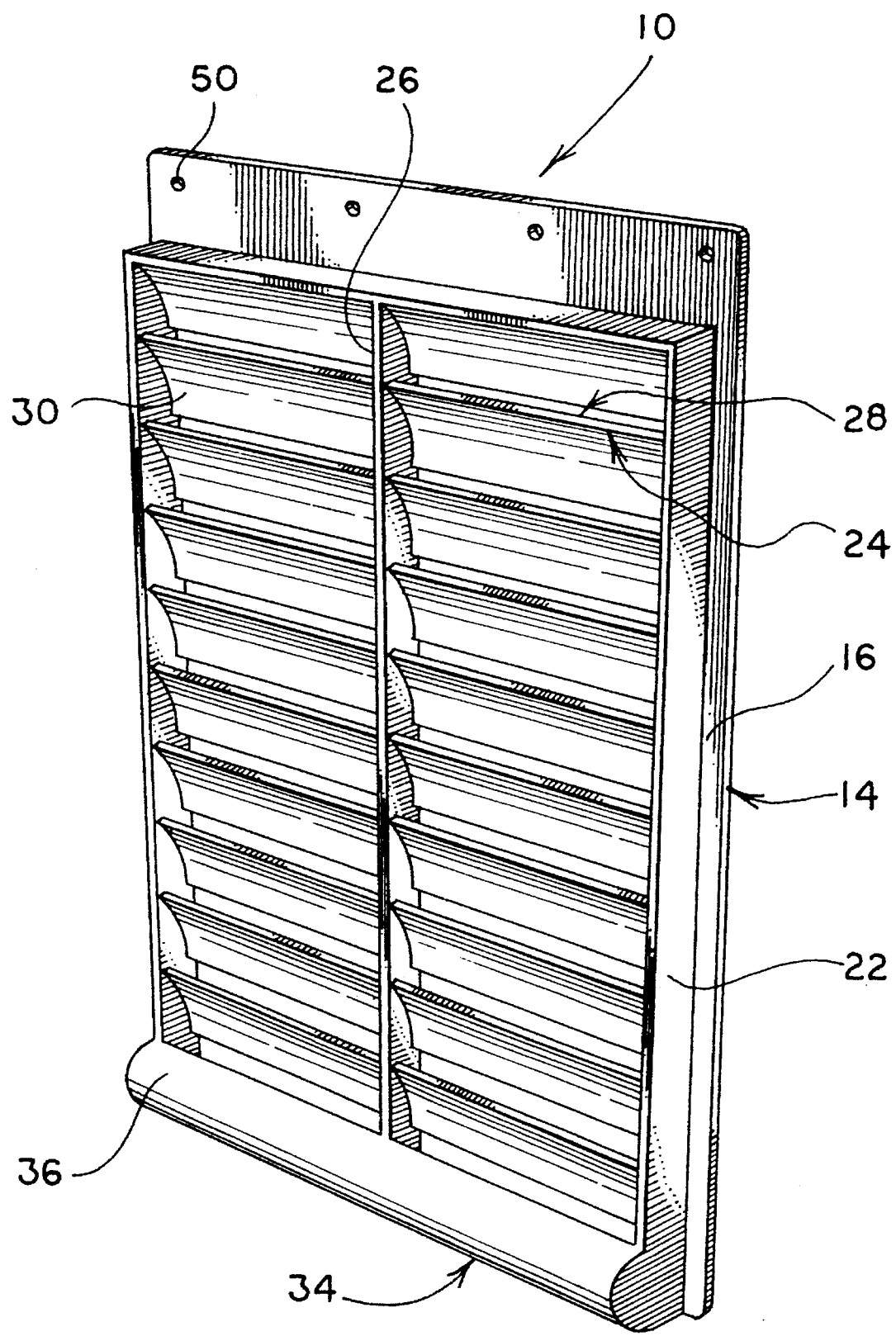
FIG. 2 is a perspective view of the other side of the vehicle mud flap of FIG. 1, that is, the side facing the tire of the vehicle.
Figure 3:
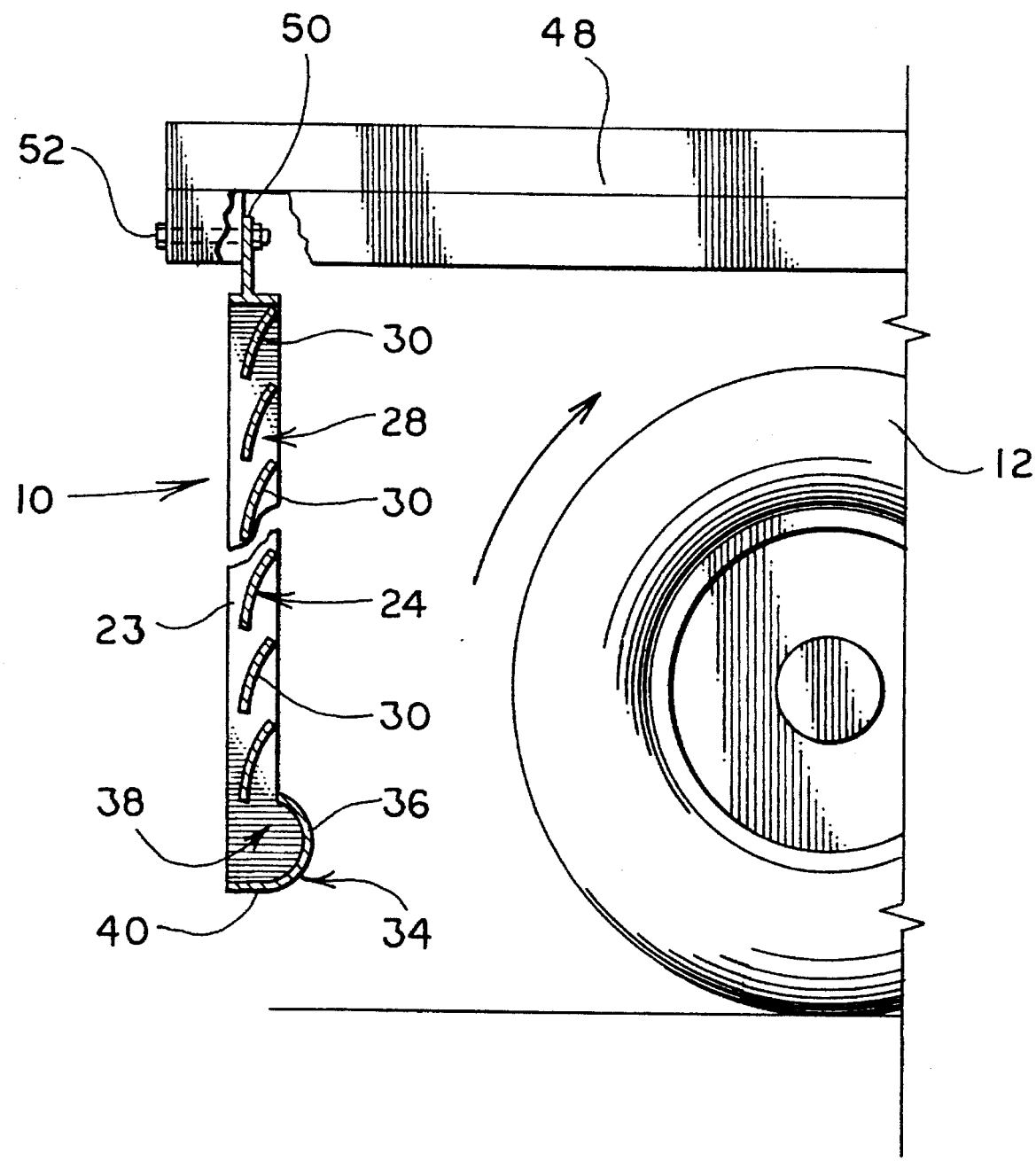
FIG. 3 is a somewhat schematic, fragmented side elevational view of a vehicle carrying the vehicle mud flap of FIGS. 1 and 2 which is shown in partial cross-section.

A vehicle mud flap made in accordance with the concepts of the present invention is generally indicated by the numeral 10 in the drawings. Mud flap 10 is preferably fabricated from a polymeric material, such as polypropylene or the like, which may be molded employing current molding technology. As is known in the art, and as shown in FIG. 3, a mud flap 10 can be positioned behind a vehicle tire 12 or tires, as the case may be, for any given vehicle. As such, mud flap 10 has a side facing tire 12, hereinafter referred to as the "front" side of mud flap 10, and a side facing the rear of the vehicle, that is, the "rear" side of mud flap 10.

The rear side of mud flap 10 is provided with a frame generally indicated by the numeral 14. Frame 14 includes a pair of substantially parallel, generally vertical, side members 16, a generally horizontal top member 18 extending between the tops of side members 16, and a bottom member 20 extending between the bottoms of side members 16.

Frame 14 also includes side walls 22 carried by top member 18 and extending forwardly from side members 16 toward tire 12. Extending rearwardly from the interior edge of side members 16, top member 18 and bottom member 20 is a ridge 23 which is somewhat like, but a bit smaller than, side walls 22. Side walls 22 carry a plurality of angularly-directed, parallel vanes 24. If desired, a vertical rib member 26 may be positioned generally midway between side walls 22, and thus intersect vanes 24 generally midway thereof. As such, a plurality of debris openings 28 are defined between adjacent vanes 24 and between rib member 26 and its adjacent side wall 22.

While vanes 24 could be straight members, they are preferably shown as being arcuate in nature having a concave side 30 at the front of flap 10 and a corresponding convex side 32 at the rear of flap 10. As such, water or debris, transmitted by tire 12 to flap 10, will strike the concave surfaces 30 of vanes 24 and be directed downwardly through openings 28.

The bottom of the front side of flap 10 may be provided with a roll base generally indicated by the numeral 34 which extends generally perpendicularly between side walls 22. Roll base 34 includes a front semi-circular surface 36 with a corresponding cavity 38 being formed in the rear of flap 10. As shown in the drawings, the bottom 40 of surface 36 may coincide, if desired, with bottom frame member 20. Also, as shown, rib 26 preferably extends down to the top of surface 36 of roll base 34. Since roll base 34 extends outwardly from the front side of flap 10 toward tire 12, it provides a point of first contact against tire 12 when an object such as a loading dock bears upon the rear of mud flap 10. By absorbing this first contact, roll base 34 prevents mud flap 10 from locking into tire tread and becoming frayed, damaged or torn off.

Top frame member 18 includes a plurality of apertures 50 which, as shown in FIG. 3, may receive fasteners 52 for attachment to vehicle 48. Of course, other methods of attachment may be employed.

In operation, as vehicle 48 proceeds in a forward direction, vehicle tire 12 rotates in a clockwise direction and any debris, such as water, mud or rocks trapped between vehicle tire 12 and the road surface, is projected rearwardly so as to strike vehicle mud flap 10. The debris strikes concave surface 30 and is directed through openings 28. Because the plurality of vanes 24 curve downwardly from the front side to the rear side, the debris is prevented from striking any vehicle following vehicle 48. Some debris which strikes the concave surface 30 may also begin to splash to the side. However, such side splash is less prevalent than in the prior art because most of the debris is directed downwardly through openings 28. But, in the present invention, the chances of this sidewardly-directed debris being directed to a vehicle that is passing or travelling on either side of the vehicle is diminished because that debris strikes the interior of side walls 22, ridge 23 and the rib 26.

The present invention also allows for the aerodynamic flow of air through vehicle mud flap 10. The airflow, which follows the same path as the debris directed from vehicle tires 12, hits the uppermost portion of the vane 24 and, in particular, concave surface 30. The airflow is then directed downwardly from concave surface 30 and flows through debris opening 28 while striking the convex surface 32 of a vane 24 disposed immediately below. This aerodynamic flow of air through vehicle mud flap 10 serves three primary purposes. First, the drag coefficient of the vehicle 48 is reduced, thereby making vehicle 48 more fuel efficient. Second, the airflow helps maintain vehicle mud flap 10 in a near vertical relationship with respect to vehicle tire 12. In other words, vehicle mud flap 10 is not as likely to "lift" or become horizontal with respect to tire 12 because of the airflow. As such, vehicle mud flap 10 is more likely to divert or block any debris that has a low profile trajectory from the vehicle tire 12. Third, the flow through aspect of mud flap 10 reduces side splash. Additionally, since the plurality of parallel vanes 24 extend the entire width of vehicle mud flap 10, more airflow is directed therethrough than has heretofore been known in the art.

Thus the present invention operates to more efficiently disperse the heat generated between tire 12 and the road surface. Whereas prior vehicle mud flaps would trap heated air between the tire and the mud flap itself, thereby increasing the temperature of the tire 12, it will be appreciated that the present invention precludes excessive tire heat buildup and thereby reduces dangerous situations.

The flaps 10 just described are designed especially for the trailer portion of a truck or any wheel of a car. If flaps 10 were to be used for the tractor portion of a tractor-trailer vehicle, the upper outside corner portion of the flaps may be removed. Mud flaps 10 modified in such a manner prevent the trailer portion of vehicle 48 from coming in contact therewith as vehicle 48 turns. As such, the trailer portion of vehicle 48 does not damage mud flaps carried by the tractor portion.

It should thus be evident that an energy-saving and heat-ventilating vehicle mud flap, as disclosed herein, can be economically fabricated using existing molding technology which effectively increases the aerodynamic profile of the vehicle carrying the mud flap and which reduces the amount of heat generated by the tire and adjacent road surface and is lighter in weight than common mudflaps. Furthermore, the vehicle mud flap and outwardly extending roll base increases the usable life of the mud flap. Thus, the invention disclosed herein and defined by the following claims, accomplishes the objects of the present invention and otherwise constitutes an advantageous contribution to the art.

We claim:

1. A vehicle flap, adapted to be carried rearwardly of a vehicle tire, comprising a top member adapted to be attached to the vehicle; a pair of substantially parallel side walls carried by said top member; and a plurality of fixed, arcuate, substantially identical, angularly-directed vertically adjacent parallel vanes substantially perpendicularly positioned between said side walls, wherein each said parallel vane is oriented in a horizontal position so that corresponding points on each said parallel vane are in a same vertical plane, the arc of said parallel vanes having a constant radius, said parallel vanes and said side walls forming a plurality of openings therebetween, said parallel vanes having a top surface and a bottom surface with a concave surface therebetween facing the tire and a corresponding convex surface facing away from the tire, the top surface of one said parallel vane being vertically at generally the same position as the bottom surface of its adjacent said parallel vane, said parallel vanes redirecting any debris from a rotating vehicle tire downwardly through said openings, wherein the debris and airflow strike the concave surface and wherein at least the airflow strikes the corresponding convex surface of the vane immediately therebelow and proceeds through said opening without any further impediment from the vehicle flap.

2. A vehicle flap according to claim 1 further comprising a roll base extending between said side wall members and extending outwardly toward said vehicle tire.

3. A vehicle flap according to claim 1 wherein said side walls have a front side facing the vehicle tire and a rear side facing away from the tire and wherein said plurality of vanes are downwardly directed from the front side toward the rear side.

4. A vehicle flap according to claim 1 further comprising a rib between said side walls and intersecting said plurality of vanes.

5. A vehicle flap adapted to be carried by a vehicle comprising a frame with a front side facing a vehicle tire and a rear side facing away from the tire, said frame being adapted to be carried by a vehicle; and a plurality of fixed, arcuate, substantially identical, angularly-directed vertically adjacent parallel vanes within said frame extending downwardly from the front side to the rear side, wherein each said parallel vane is oriented in a horizontal position so that corresponding points on each said parallel vane are in a same vertical plane, the arc of said parallel vanes having a constant radius, said parallel vanes forming a plurality of openings therebetween, said parallel vanes having a top surface and a bottom surface with a concave surface therebetween facing the tire and a corresponding convex surface facing away from the tire, the top surface of one said parallel vane being vertically at generally the same position as the bottom surface of its adjacent said parallel vane, said parallel vanes redirecting any debris from a rotating vehicle tire downwardly through said openings, wherein the debris and airflow strike the concave surface and wherein at least the airflow strikes the corresponding convex surface of the vane immediately therebelow and proceeds through said opening without any further impediment from the vehicle flap.

6. A vehicle flap according to claim 5 wherein said frame has a pair of substantially parallel side walls, said plurality of parallel vanes being positioned between said side walls, said frame also including a top member substantially perpendicular to said side walls, said top member adapted to be attached to the vehicle.

7. A vehicle flap according to claim 6 further comprising a roll base extending outwardly from the front side of said frame toward the vehicle tire.

8. A vehicle flap according to claim 6 further comprising a rib between and generally parallel with said side walls and intersecting said plurality of vanes.

* * * * *